(12) United States Patent
Ono

(10) Patent No.: US 6,757,772 B2
(45) Date of Patent: Jun. 29, 2004

(54) INTERFACE DEVICE, NODE, INTERFACE SYSTEM, METHOD FOR CONTROLLING BUS RESET AND COMPUTER PROGRAM PRODUCT FOR CONTROLLING BUS RESET

(75) Inventor: Koichi Ono, Iwatsuki (JP)

(73) Assignee: Minolta Co., Ltd., Osaka (JP)

( * ) Notice: Subject to any disclaimer, the term of this patent is extended or adjusted under 35 U.S.C. 154(b) by 573 days.

(21) Appl. No.: 09/866,746

(22) Filed: May 30, 2001

(65) Prior Publication Data

US 2002/0004872 A1 Jan. 10, 2002

(30) Foreign Application Priority Data

Jun. 2, 2000 (JP) ........................................ 2000-166596

(51) Int. Cl.[7] .......................... G06F 13/00; G06F 13/38
(52) U.S. Cl. .......................................... 710/302; 713/1
(58) Field of Search ................... 710/1, 100, 300–304, 710/104, 105; 713/1, 100, 500, 502

(56) References Cited

U.S. PATENT DOCUMENTS 6,505,264 B1 * 1/2003 Ono et al. ................... 710/107
6,529,977 B1 * 3/2003 Nyu ............................ 710/100
6,671,759 B1 * 12/2003 Noda et al. .................. 710/104

2001/0042141 A1 * 11/2001 Matsunaga et al. ............ 710/1

FOREIGN PATENT DOCUMENTS

| JP | 10-055232 | 2/1998 |
|----|-----------|--------|
| JP | 10-191283 | 7/1998 |
| JP | 11-205353 | 7/1999 |

OTHER PUBLICATIONS

Yamamoto et al., "An Intelligent IEEE 1394 Hub Architecture" IEEE 2002, pp. 249–252.*

* cited by examiner

Primary Examiner—Xuan M. Thai
(74) Attorney, Agent, or Firm—Burns, Doane, Swecker & Mathis, L.L.P.

(57) ABSTRACT

With reference to an interface that performs bus reset and reconfiguration of a bus when a node is plugged or unplugged in correspondence with the hot swapping function, when the node plugging/unplugging detector 43 detects plugging or unplugging of a node, the data transfer detector 44 detects whether data related to a specific node is transferred on the bus. When it is detected that the data related to the specific node is transferred, the bus reset issue controller 45 holds the notification of the unplugging of said node to the physical layer 41 until the data transfer is completed, thus delaying the issue of the bus reset. The interface device is capable of delaying only the specific data transfer being preferable not to be interrupted thus effectively protecting the hot swapping function.

17 Claims, 7 Drawing Sheets

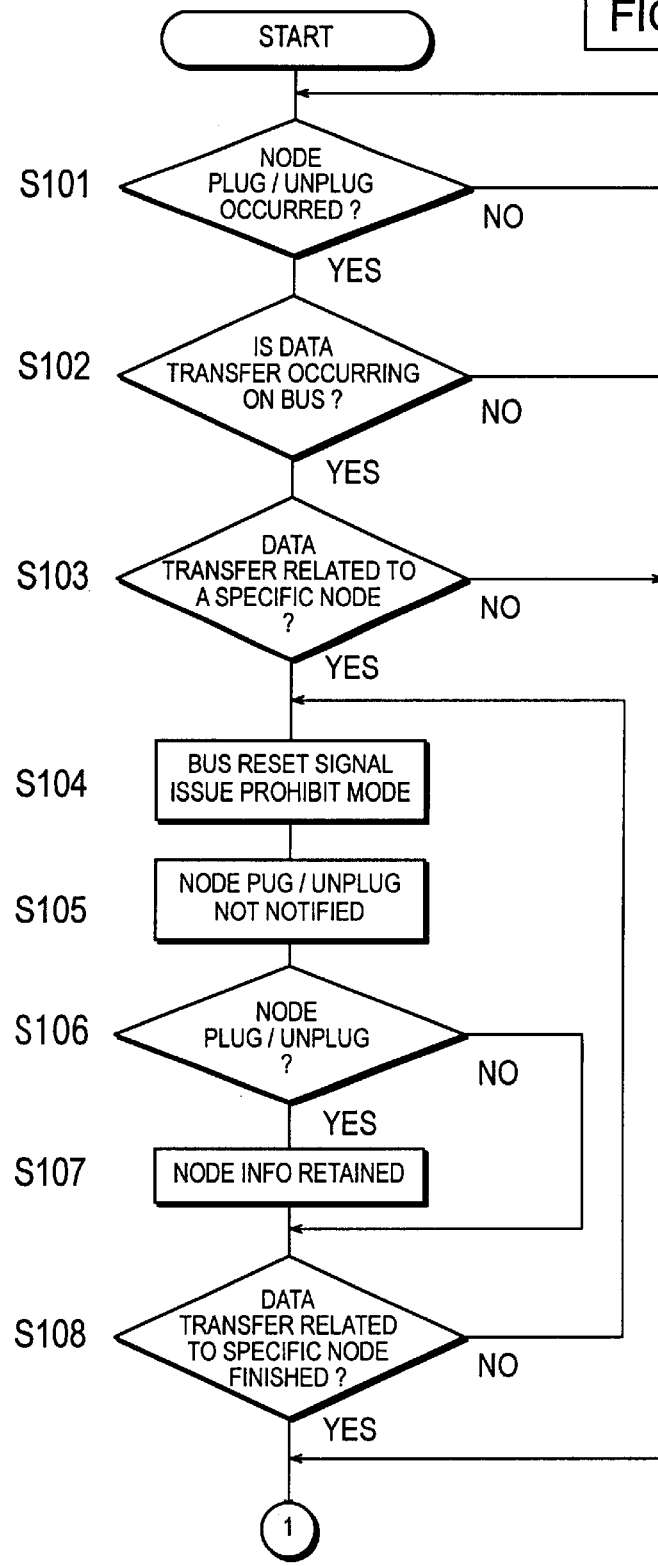

INTERFACE DEVICE, NODE, INTERFACE SYSTEM, METHOD FOR CONTROLLING BUS RESET AND COMPUTER PROGRAM PRODUCT FOR CONTROLLING BUS RESET

This application is based on Japanese Patent Application No. 2000-166596 filed on Jun. 2, 2000, the contents of which are hereby incorporated by reference.

BACKGROUND OF THE INVENTION

1. Field of the Invention

The invention relates to a method for controlling bus reset and its devices to be used in an interface that has a so-called hot swapping function and performs reset and reconstruction of a bus when a node is plugged or unplugged.

2. Description of Related Art

Since serial interfaces such as the IEEE 1394 (IEEE 1394-1995 High Performance Serial Bus) and USB (Universal Serial Bus) generally have high communication speeds and high expandability, they have come to be used widely as high speed interfaces for connecting personal computers and their peripheral equipment.

Such a high speed serial interface allows us to connect many pieces of equipment to constitute a system assuming a tree structure, and automatically detecting and setting up nodes (each piece of equipment on a bus is called a node) that are connected in response to a plug-and-play feature. Furthermore, the system can be easily expand in such a high speed serial interface, since it allows the nodes to be plugged or unplugged while the power is turned on because of a hot swapping function (sometimes called hot plugging) and has no need to be reset after plugging or unplugging of a node.

In such a high speed serial interface, a mechanism is used where bus reset is caused when a node is plugged or unplugged to initialize the interface function of each node and automatically reassigning the address to each node at the same time by reidentifying the bus configuration and reassigning the address of each node in order to realize such a hot swapping function.

When a node plugging or unplugging is performed while another node is transferring data in an interface in which bus reset and reconfiguration are performed in accordance with a plugging or unplugging of a node, bus reset occurs for the entire bus, so that the data transfer will be interrupted thus requiring the data transfer to be restarted all over again. An interruption of such a data transfer will not only be a major hazard for a specific data transfer such as a transfer of printing data or a real time transfer of dynamic images or voice data, but also a fatal problem, for example, a data damage or loss, or a resulting hang up of an Operating System or application.

As a means of avoiding an interruption of a data transfer due to bus reset in such an interface, several methods have been proposed including an interface device that prevents node plugging or unplugging altogether by locking a connector during a data transfer (JP-10-55232-A), and a method of making each node to remember its address information so that even if a node plugging or unplugging occurs and consequently a bus reset occurs, it is still possible to continue to transmit the same data after the bus reset and reconfiguration (JP-10-191283-A). As a means of delaying bus reset until a data transfer has been completed, a method has been proposed (JP-11-205353-A) wherein, when a bus reset signal is received, the bus reset is delayed by means of a flag for delaying the bus configuration recognition procedure until its own data transfer is completed, and a packet data for restarting the bus reset procedure is transmitted to all nodes when data transfers of all the node are completed to identify the bus configuration and reassign the node addresses. However, in this methods, the bus reset will be delayed irrespective of the type of node and data currently being transferred or received, and it is self-defeating the basic purpose of the hot swapping to delay bus reset unconditionally because a data transfer may not cause any substantial problem depending on the type of node or data being transferred.

SUMMARY OF THE INVENTION

The invention is made in consideration of those problems of the prior art described above, and its intention is to provide an interface device, a node, an interface system, a method for controlling bus reset, and computer program product for controlling bus reset, which are capable of delaying only the specific data transfer being preferable not to be interrupted thus effectively protecting the hot swapping function.

The objective stated above can be accomplished with the following means.

The invention is an interface device for use in an interface that performs reset and reconfiguration of a bus when a node is plugged or unplugged comprising:

- a node plugging/unplugging detector for detecting plugging and unplugging of a node;
- a data transfer detector for detecting whether a data transfer related to a specific node is occurring on said bus when node plugging or unplugging is detected by said node plugging/unplugging detector; and
- a bus reset issue controller for delaying issue of bus reset when a data transfer related to said specific node is detected by said data transfer detector until said data transfer is completed.

Furthermore, the invention is a node of an interface that performs reset and reconfiguration of a bus when a node is plugged or unplugged, which is equipped with an interface device comprising:

- a node plugging/unplugging detector for detecting plugging and unplugging of a node;
- a data transfer detector for detecting whether a data transfer related to a specific node is occurring on said bus when node plugging or unplugging is detected by said node plugging/unplugging detector; and
- a bus reset issue controller for delaying issue of bus reset when a data transfer related to said specific node is detected by said data transfer detector until said data transfer is completed.

Furthermore, the invention is an interface system that performs reset and reconfiguration of a bus when a node is plugged or unplugged and is composed of interconnected nodes each of which is equipped with an interface device comprising:

- a node plugging/unplugging detector for detecting plugging and unplugging of a node;
- a data transfer detector for detecting whether a data transfer related to a specific node is occurring on said bus when node plugging or unplugging is detected by said node plugging/unplugging detector; and
- a bus reset issue controller for delaying issue of bus reset when a data transfer related to said specific node is detected by said data transfer detector until said data transfer is completed.

Furthermore, the invention is a method for controlling bus reset in an interface that performs reset and reconfiguration of a bus when a node is plugged or unplugged comprising the step of:

detecting plugging and unplugging of a node;

detecting whether a data transfer related to a specific node is occurring on said bus when node plugging or unplugging is detected; and delaying issue of bus reset when a data transfer related to said specific node is detected until said data transfer is completed.

Furthermore, the invention is a computer program product for controlling bus reset in an interface that performs reset and reconfiguration of a bus when a node is plugged or unplugged, said program causing a computer to execute the procedure of:

detecting plugging and unplugging of a node;

detecting whether a data transfer related to a specific node is occurring on said bus when node plugging and unplugging is detected; and delaying issue of bus reset when a data transfer related to said specific node is detected until said data transfer is completed.

DESCRIPTION OF THE PREFERRED EMBODIMENTS

Some preferred embodiments of the interface device according to this invention will be described below in detail.

The interface according to this invention is a standard and specification for procedures, devices and technologies for interconnecting between personal computers themselves, between personal computers and peripheral equipment, between peripheral equipment, between consumer appliances, and between personal computers and peripheral equipment and consumer appliances, and it generates bus reset and initializes the interface function of each node as well as automatically reassigns a new address to each node reidentifying the bus configuration, when a new node is connected or an existing node is removed on the bus. Serial interfaces based on the IEEE 1394 standard and the USB standard (hereinafter "IEEE 1394" and "USB") are examples of such an interface. The interface device according to this invention will be described referring primarily to the IEEE 1394.

Figure 1A:
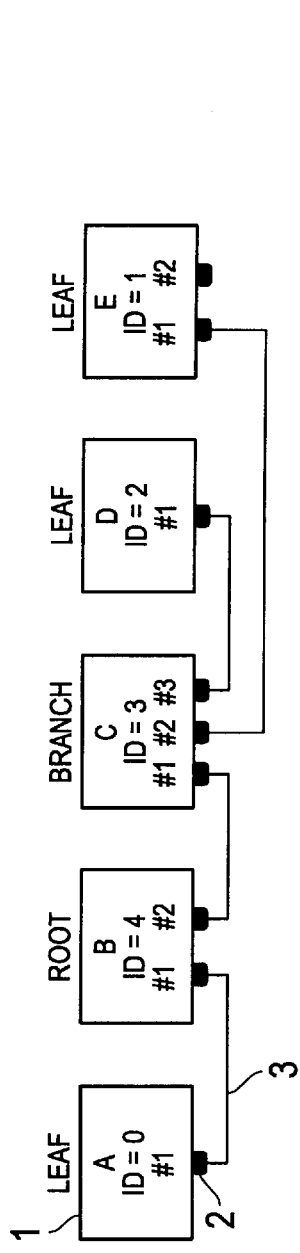
FIG. 1 is a conceptual drawing of an interface system for describing the bus reset in the IEEE 1394 and automatic assignment of node addresses.
Figure 1B:
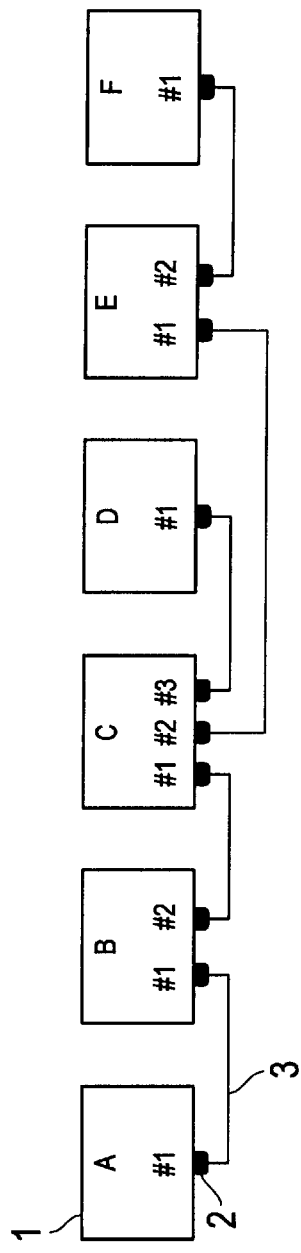
Figure 1C:
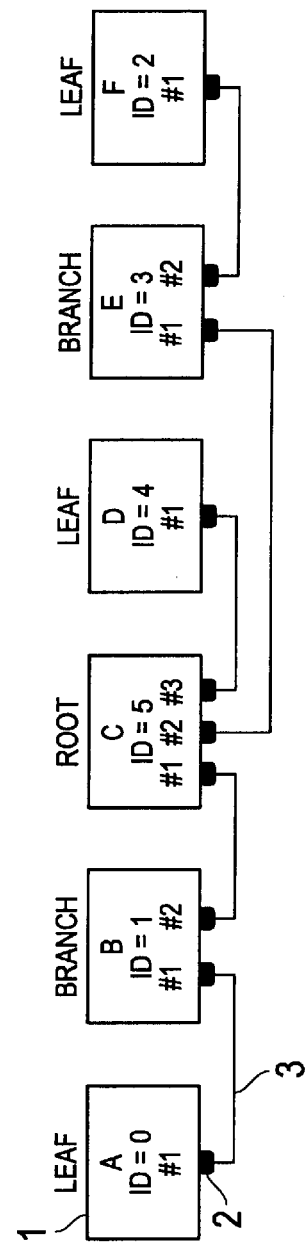

FIGS. 1(a)–1(c) are a conceptual drawing showing a typical IEEE 1394 interface system to describe bus reset and automatic assignment of node addresses in the IEEE 1394. FIGS. 1(a)–1(c) show a node 1, a connector port 2, and a connector cable 3, wherein #1 through 3 represent the port number of each connector port. According to the IEEE 1394, the node 1 is equipped with one or more connector ports 2, so that a system can be formed extremely easily and freely by connecting the ports with the connector cable 3 to cause the nodes to be connected in chains or to be branched out in tree or star shapes.

In FIG. 1(a), connections are made with the connector cable 3 between the port #1 of the node A and the port #1 of the node B, the port #2 of the node B and the port #1 of the node C, the port #3 of the node C and the port #1 of the node D, and the port #2 of the node C and the port #1 of the node E. The port #2 of the node E is not connected to any node at this point in time. The nodes A, D and E are leaves, the node C is a branch, and the node B is a root. The node IDs=0, 4, 3, 2 and 1 are assigned to the nodes A, B, C, D and E as node addresses. In other words, the nodes of the IEEE 1394 are all assigned with node addresses and each of them is thus identified as a portion of the bus.

Next, the bus reset will be described. In FIG. 1(b), when a new node F is connected to the port #2 of the node E, the node E detects the connection of the node F and transmits a bus reset signal to the node C. Receiving this bus reset signal from the node E, the node C transmits the bus reset signal to the node B and the node D, while the node B transmits the bus reset signal to the node A upon receiving the bus reset signal from the node C. When a node is connected or removed on the bus, adjacent nodes, detecting the change by means of a change in the bias voltage, send out the bus reset signal to all nodes on the bus. Receiving the bus reset signal, the connection information each node has had will be initialized.

Next, the automatic node address assignment will be described. Each node, which has been initialized in FIG. 1(c), raises a flag indicating that the master-slave relation has not been defined. Since the node A becomes a leaf as it is connected only to the node B, and raises a flag declaring that a master-slave relation has been defined where it is a slave and the node B is its master node. Similarly, the nodes D and F become leaf as well and set up flags declaring that master-slave relations have been established where the nodes C and E are their master nodes respectively. Since the node B connects to two nodes, i.e., the nodes A and C, it becomes a branch, receives a master-slave declaration from the node A, and raises a flag declaring that the master-slave relation has been defined and the node C is its master node. Similarly, the node E also becomes a branch, receiving a master-slave declaration from the node F, and raises a flag declaring that a master-slave relation has been defined and the remaining node C is the master node. The node C, which is defined last, becomes the root.

As the route is defined as shown above, the node A, which is the distal end leaf of the slave node connected to the smallest number port, i.e., port #1, of the node C, which is the root, becomes the node ID=0, the node A broadcasts its own node ID and the equipment information to other nodes.

Next, tracing backwards through the tree, the node IDs=1, 2, 3 and 4 will be assigned to the nodes B, F, E and D respectively, and the largest node ID=5 will be assigned to the node C, which is the last node.

Next, the data transfer method in the IEEE 1394 will be described. The data transfer in the IEEE 1394 is repeated every 125 µs and one of the nodes, typically the root, becomes the cycle master to control the cycle execution. The cycle master broadcasts a cycle start packet every 125 µs, and each node performs data transfer either by the isochronous transfer (synchronous transfer) or asynchronous transfer method knowing the cycle start timing on receiving said packet.

Figure 2:
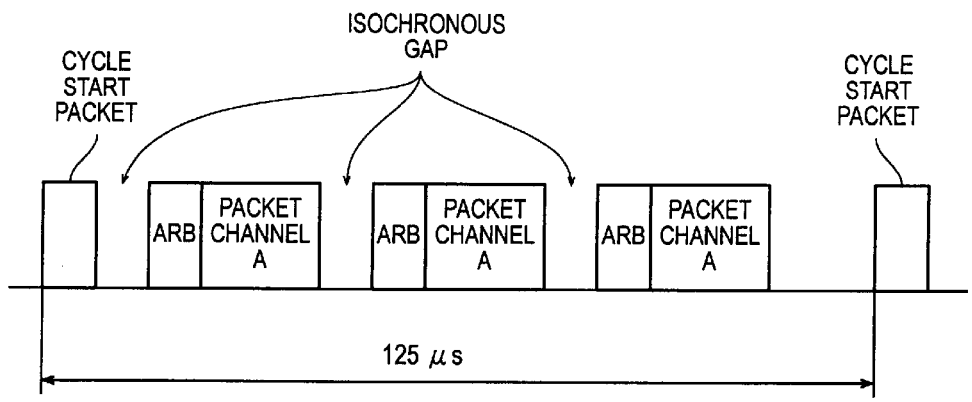
FIG. 2 is a conceptual drawing of chronological transition of the isochronous transfer in the IEEE 1394.
Figure 3:
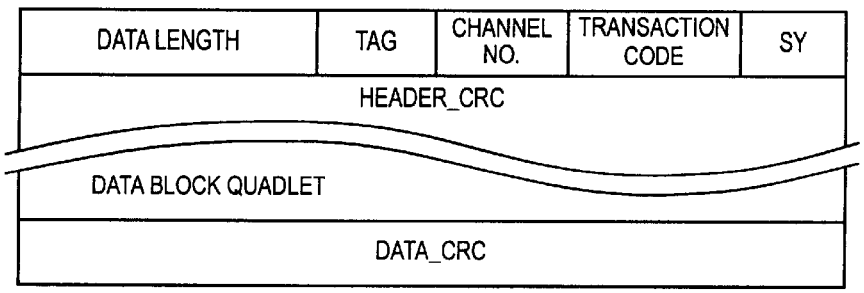
FIG. 3 is a model drawing showing the internal construction of a data packet for the isochronous transfer in the IEEE 394.

FIG. 2 is a drawing showing the chronological transition during the isochronous transfer in the IEEE 1394 and FIG. 3 is a schematic drawing showing the internal construction of a data packet for the isochronous transfer in the IEEE 394. In order to avoid data crash, the node that is to request an isochronous transfer issues a request for the bus usage right in an isochronous gap, which is the bus unused period for the isochronous transfer, after receiving the cycle start packet. A node that obtained the bus usage right through arbitration (arb), broadcasts the data including the channel number and a node that wishes to receive the data receives the data by specifying the channel number.

Figure 4:
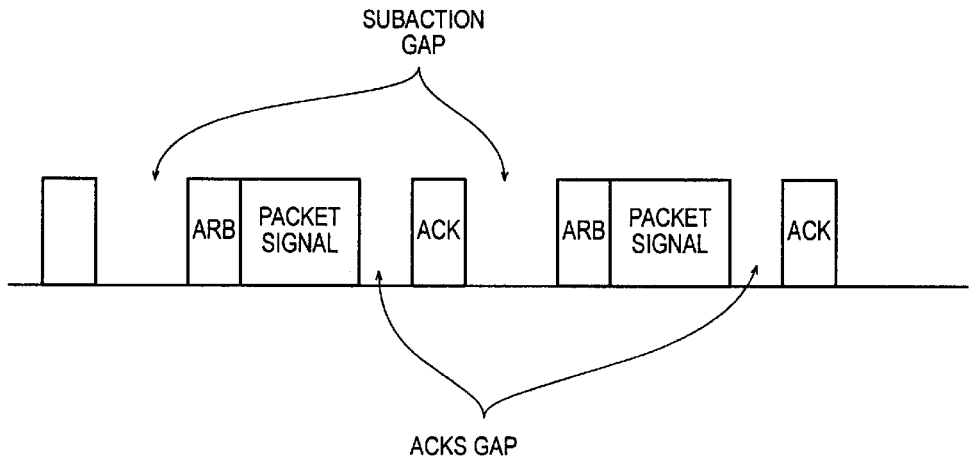
FIG. 4 is a conceptual drawing of chronological transition of the asynchronous transfer in the IEEE 1394.
Figure 5:
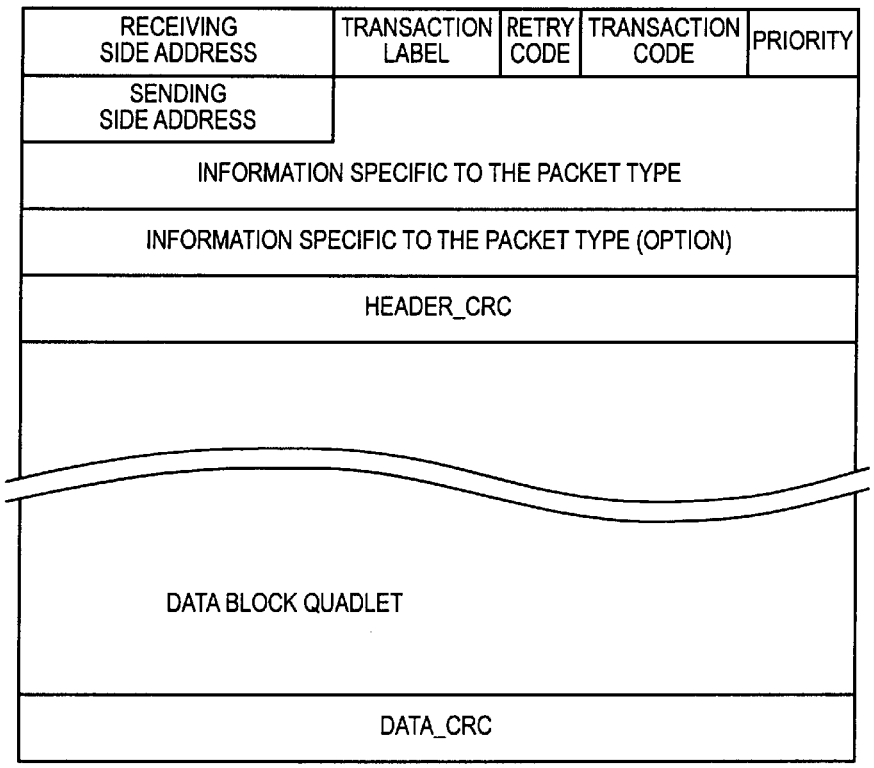
FIG. 5 is a model drawing showing the internal constitution of a data packet for the asynchronous transfer in the IEEE 1394.

Similarly, FIG. 4 is a drawing of chronological transition of the asynchronous transfer in the IEEE 1394 and FIG. 5 is a drawing showing the internal constitution of a data packet for the asynchronous transfer in the IEEE 1394. A node that wishes to make an asynchronous transfer initiates an arbitration after confirming a sub-action gap, which is a bus unused period for the asynchronous transfer, and the node that obtained the bus usage right broadcasts the data. A node that received the data determines whether it is the data for itself based on the receiving side node address within the packet. Since the sub-action gap is longer than the isochronous gap, the isochronous transfer has the priority if both data transfer exists mixedly.

Figure 6:
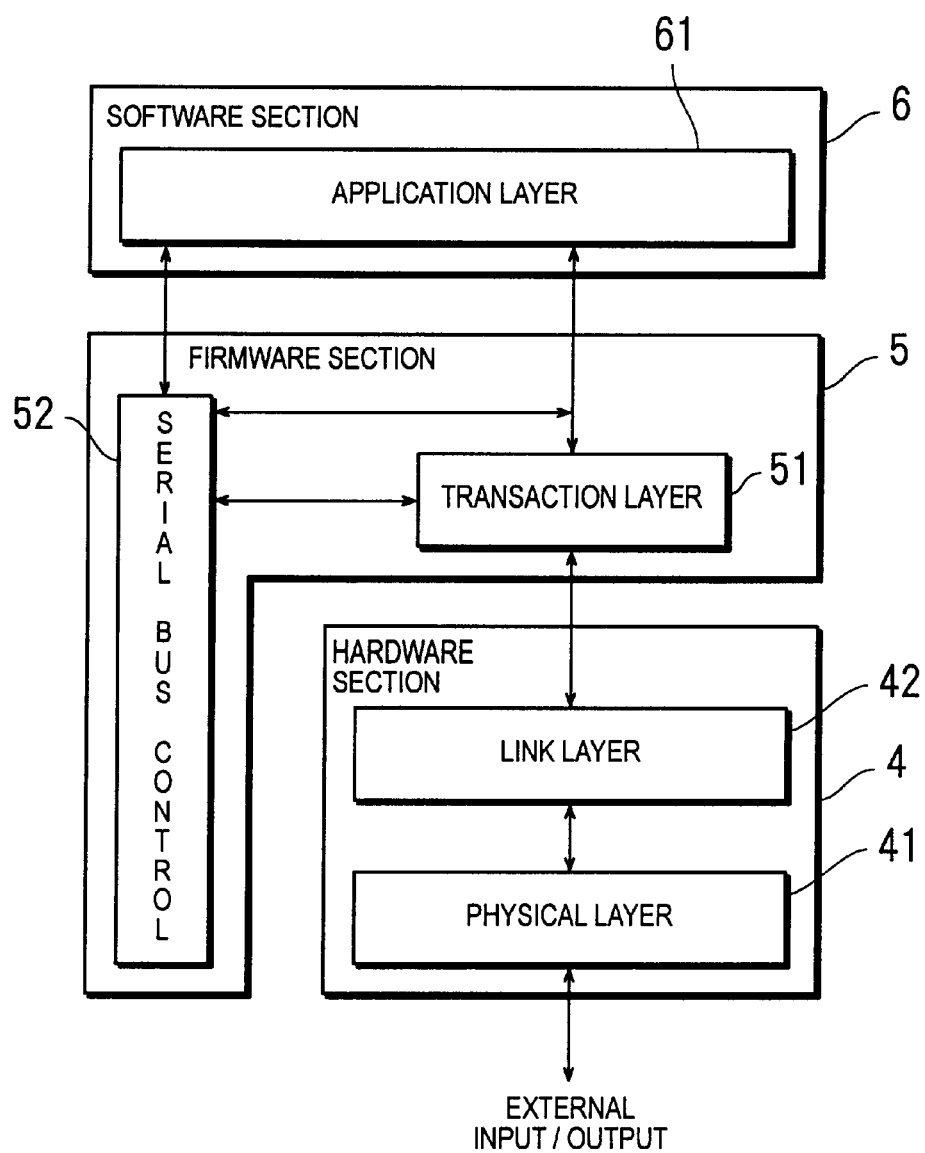
FIG. 6 is a block diagram showing the construction of a conventional interface device for the IEEE 1394.

FIG. 6 is a block diagram showing the construction of a conventional interface device for the IEEE 1394. The conventional interface device for the IEEE 1394 consists of a hardware section 4, firmware section 5 and a software section 6. The hardware section 4 consists of a physical layer 41 and a link layer 42, while the physical layer 41 is connected with an external input/output via a connector port (not shown). The physical layer 41 performs encoding and controls connections, etc., while the link layer 42 performs packet transfer and controls cycle time, etc. The firmware section 5 consists of a transaction layer 51 and a serial bus controller 52. The transaction layer 51 controls the transferred data, issuing read, write and lock orders, while the serial bus controller 52 controls the connection status of each node connected on the bus and performs the ID control. The software section 6 consists of an application layer 61 and the application layer 61 varies with the software used, and the data transfer method will be determined by the protocol to be used.

Figure 7:
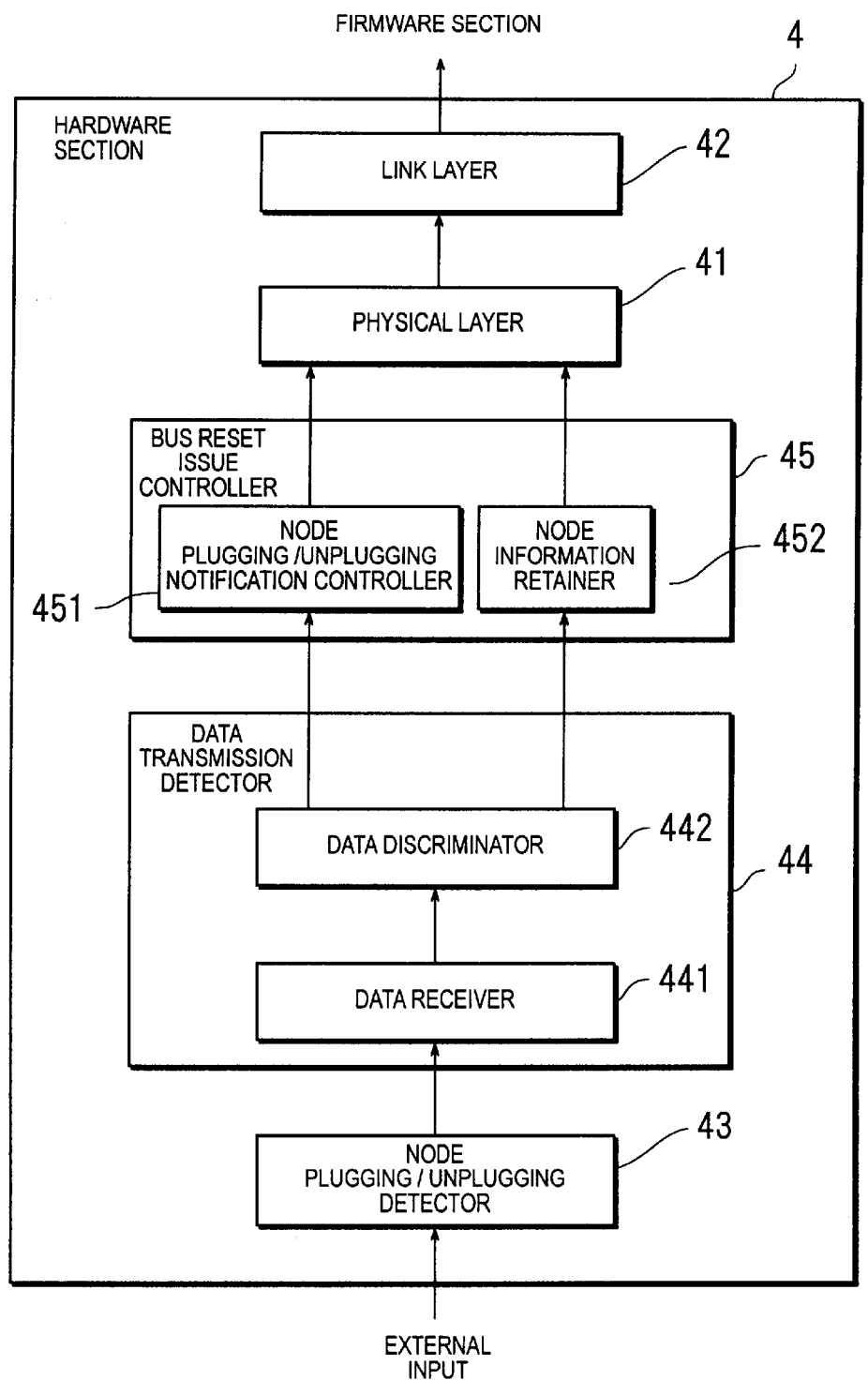
FIG. 7 is a block diagram showing an embodiment construction of the hardware portion of an interface device for the IEEE 1394 according to this invention.

Next, an embodiment of the interface device according to this invention in the IEEE 1394 will be described. FIG. 7 is a block diagram showing the construction of the hardware section, which is the characteristic part of the interface device according to the embodiment. As shown in FIG. 7, the interface device of this embodiment has a node plugging/unplugging detector 43, a data transfer detector 44 and a bus reset issue controller 45 in the lower level of the physical layer 41 of the hardware section in the aforementioned IEEE 1394 construction. The data transfer detector 44 has a data receiver 441 and a data discriminator 442, and the bus reset issue controller 45 has a node plugging/unplugging notification controller 451 and a node information retainer 452. The node plugging/unplugging detector 43 will be connected to an external input via connector port, while it is connected to the data receiver 441 of the data transfer detector 44 on upper side. The data receiver 441 is connected to the data discriminator 442, the data discriminator 442 is connected to the node plugging/unplugging notification controller 451 and the node information retainer 452 of the bus reset issue controller 45, and the node plugging/unplugging notification controller 451 and the node information retainer 452 are both connected directly to the physical layer 41. In other words, these parts as a whole constitute a virtual physical layer and form a virtual external environment against real physical layer 41, thus realizing a proper hot swapping function by delaying the bus reset selectively only for specified data transfers by measuring the bus reset timing.

As to the data transfer types that can be the objects of bus reset delay in the interface device of this embodiment include transfers of printing job data, voice data, and image data including dynamic images and static images. If a node plugging or unplugging occurs on the bus during such a data transfer, the data transfer will be interrupted due to the bus reset, so that it can not only be a major hazard for a specific data transfer such as a transfer of printing data or a real time transfer of motion pictures (digital video) or voice data, but also be a fatal problem under a certain circumstance, for example, a data damage or loss, or a resulting hang up of an OS or application. In case of the interface device according to this embodiment, when a node plugging or unplugging occurs on the bus, a particular node related to such a data transfer, for example, a printer in case of transferring a print job data, or a digital VCR in case of transferring a motion picture (digital video) data, or digital audio equipment such as an MD recorder in case of transferring a voice data, is checked to see if it is receiving or transmitting data, and bus reset is delayed until such a data transfer is finished only if such a node is receiving or transmitting data to avoid the interruption of said data transfer, but bus reset is allowed to be generated if the data transfer happens to be another type of data transfer that does not cause any problem if the interruption occurs, so that hot swapping function can be secured.

In case of the interface according to the embodiment, said specified node that can be the target of bus reset can be specified in advance by means of firmware or a device driver, or a piece of special application software can be provided to set it up properly as needed through a personal computer. In case of using such a piece of special application software, it is so configure to make it set up from a personal computer where said interface device is installed or from a personal computer connected via said interface.

Figure 8:
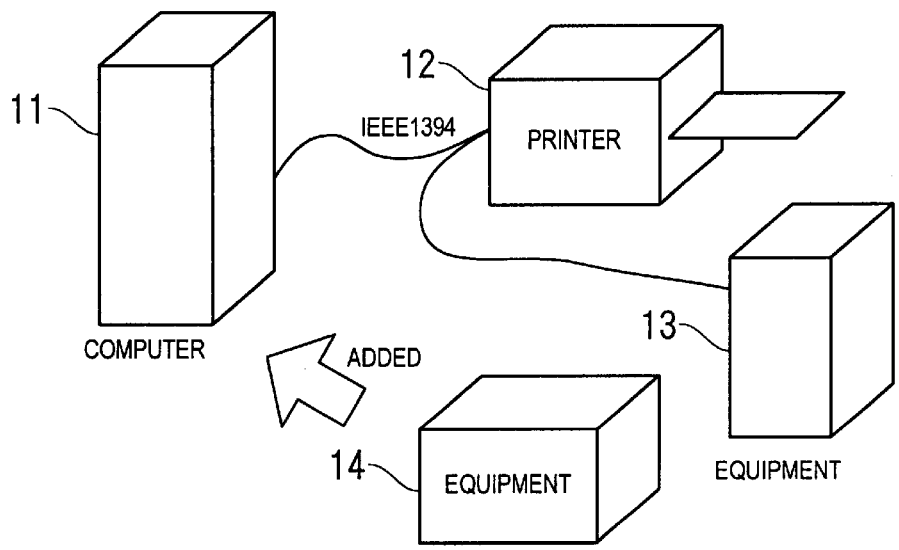
FIG. 8 is a block diagram showing an embodiment interface system for the IEEE 1394 according to this invention.

Next, a concrete procedure of the method for controlling bus reset according to this embodiment will be described. FIG. 8 is a block diagram showing the entire construction of the interface system according to this embodiment. In said interface system, a computer 11, a printer 12 and equipment 13 such as VCR, video camera and MD recorder are interconnected with the IEEE 1394, to which equipment 14 is to be added.

Figure 9B:
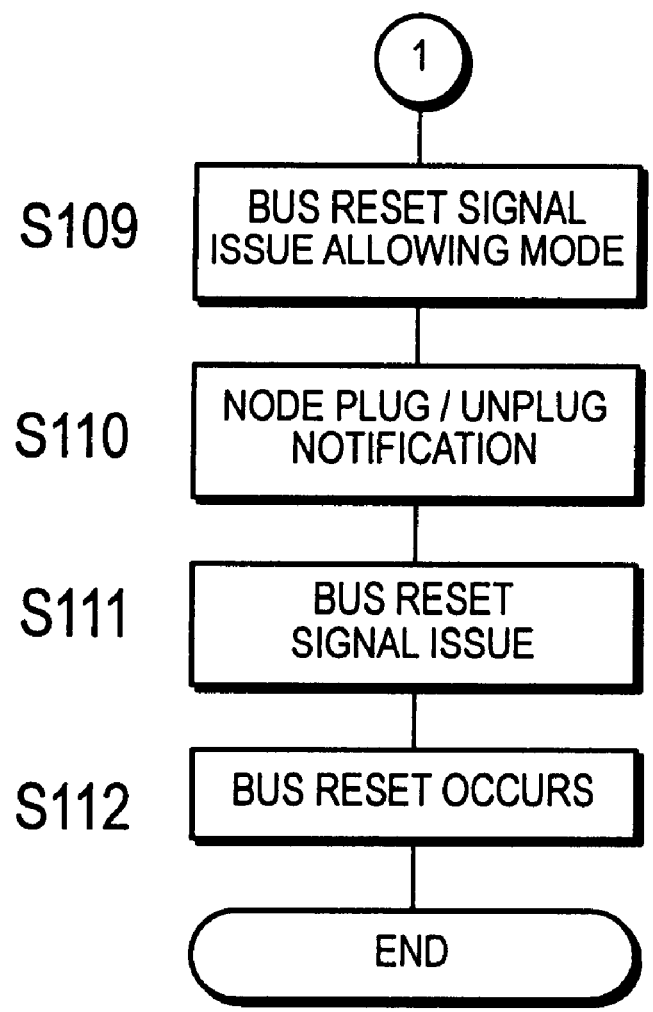
FIG. 9 is a flow chart showing the delaying sequence in bus reset of the interface device shown in FIG. 7.

FIG. 9A and FIG. 9B show a flow chart that represents a bus reset control procedure for the interface device according to this embodiment. In the interface of this embodiment, the bias voltage change occurs when a node connected to its own connector port is unplugged, or the node recognition becomes impossible due to the voltage drop, or a new node is added to its own empty connector port, so that the node plugging or unplugging is detected as the node plugging/unplugging detector 43 detects said voltage change (S101). When the node plugging or unplugging is detected, the data transfer detector 44 detects if data transfer has occurred relative to the specific node on the bus. First, all data packets that are transferred on the bus are received by the data receiver 441 of the data transmission detector 44 (S102). When the data receiver 441 receives data packets, it transfers all the data packets to the data discriminator 442 regardless of the contents of the transmitting or receiving information such as channel numbers in isochronous transfers or receiving side node addresses in asynchronous transfers. The data descriminator 442 discriminates whether any data related to specific nodes are being transferred judging from data type information or reception/transmission information contained in said data packets transferred by the data receiver 441 (S103).

The method of discriminating whether data transfer is related to specific nodes based on the information being transmitted or received will be described. According to the IEEE 1394, not only the nodes on the bus recognize each other based on the node addresses assigned to them but also they recognize what kind of equipment they are based on the standard of the IEEE 1212 CSR. In case of an asynchronous transfer, the data discriminator 442 discriminates whether any data related to a specific node are being transferred based on a judgment whether the transmitting side or receiving side node address of the data packet being transferred by the data receiver 441 is the address of said specific node. In case of an isochronous transfer, since the transfer is made by a broadcasting transmission specifying a channel without specifying the transmitting side node address, the data discriminator 442 obtains in advance the channel number that will be used by a specific node, and determines whether the data transfer related to a specific node is being conducted based on a judgment whether the channel number of the data packet transferred by the data receiver 441 is the number to be used by said specific node.

The data discriminator 442 can also discriminate whether the data transfer is related to a specific node by means of the data type information contained in the header of the data packet transferred from the data receiver 441. For example, when the specified node is a printer, it is possible to discriminate whether a particular data transfer is a transfer to the printer by judging whether it is a printing job data from the data type contained in the header.

When a data transfer concerning a specific node is detected by the data transfer detector 44, the bus reset issue controller 45 enters into a bus reset issue prohibition mode (S104), and bus reset issues will be delayed until said data transfer is completed. The node plugging/unplugging notification controller 451 of the bus reset controller 45 will not notify the plugging or unplugging of said node to the physical layer 41 until said data transfer is completed in the bus reset issue prohibition mode (S105).

If the action concerning a node mentioned above happens to be an unplugging of the node (S106), the node information retainer 452 retains the node's information concerning said unplugging until said data transfer is completed and delivers the retained information to the physical layer 41 when requested (S107). When the node that has been connected to its own connector port, or when it becomes impossible to recognize the node due to certain reasons such that the power source is disconnected, the node information retainer 452 retains the previously obtained status information of the unplugged node, sends such status information to the physical layer 41 as requested, and behaves relative to the physical layer 41 as if the unplugged node still exists on the bus in the bus reset issue prohibition mode. The physical layer 41 recognizes the node connected to its own connector port based on the information provided by the node information retainer 452, it cannot recognize it when the node is unplugged. If there happens to be data transmission to the unplugged node from the outside, the node information retainer 452 receives it on the node's behalf, it will make no response for any kind of data.

If said data transfer detector 44 does not detect the data transfer related to a specific node for a certain period of time, or if the data discriminator 442 has detected the completion information of the data transfer from the data type information, it is considered that the data transfer related to said specific node has completed (S108), and the bus reset issue controller 45 enters into a bus reset approval mode (S109). As the bus reset issue approval mode starts, the node plugging/unplugging controller 451 notifies a plugging or unplugging of a node to the physical layer 41 (S110), and a bus reset signal will be transmitted from the physical layer 41 to the link layer 42 and other nodes (S111), and the bus reset occurs (S112). As soon as the bus reset issue approval mode prevails, the retaining of the node information by the node information retainer 452 will be cancelled, and the retained information will no longer be released.

On the other hand, when the data receiver 441 of the data transfer detector 44 does not receive any data packets at S102, of the data discriminator 442 does not detect the data transfer related to a specific node at S103, the bus reset issue controller 45 will be placed under the bus reset issue approval mode (S109). Under said mode, the node plugging/unplugging controller 451 notifies plugging or unplugging of a node to the physical layer 41, but, even if a node plugging or unplugging exists, the node information retainer 452 does not retain the information of the node related to said plugging or unplugging, so that it does not send the retained information to the physical layer 41 and allows bus reset to occur as usual (S1110–S1112).

While an embodiment of the interface device of the invention applied to the IEEE 1394 was described in the above, the interface device according to this invention can be applied to USB and other standards where bus reset is generated by the hot swapping function to reidentify the bus constitution in order to control the bus reset and delay the bus reset only on those data transfer that relate to specified nodes by means of applying bus reset control procedures similar to those shown above to various standards.

The nodes to which the above interface device according to this invention can be applied include: personal computers; personal computer peripheral equipment such as external storage devices such as hard disks, optical magnetic disks, and optical disks; particularly image equipment such as scanners, printers, digital still cameras, and video captures; consumer appliance such as digital audio/video equipment such as digital VCR, set top boxes for digital TV, recording/reproducing devices such as MD, CD, and DVD; and TV game machines.

The interface system is formed by interconnecting between personal computers themselves, between personal computers and peripheral equipment, between peripheral equipment, between consumer appliances, and between personal computers and peripheral equipment and consumer appliances with connector cables. In particular, as the IEEE 1394 does not require a host, the network system includes digital still cameras, digital video cameras, etc., equipped with interface devices, connected directly with printers, or home network systems consisting of mutually interconnected personal computers and peripheral equipment as well as various home appliances, all of which are equipped with the interface devices.

The method for controlling bus reset used in an interface device according to this invention can not only be implemented by means of a dedicated hardware circuit, but also can be implemented by storing the program for executing the procedure shown in FIG. 8 on a ROM, EEPROM, or flash memory, and causing a procedure or such as a CPU to execute the program from such a memory device. If an EEPROM or a flash memory is to be used, the program can be provided by storing it in a recording medium such as a CD-ROM and write or install the program into the EEPROM or flash memory device later. The invention includes various formats that can be implement by providing program products that contain various procedures of the abovementioned bus reset control procedure and said program product includes the program itself and the recording media that contain the program.

As described above, with reference to an interface which conducts bus reset and reconfiguration when a node plugging or unplugging occurs, the invention provides a means of checking whether any data related to a specific node is being transferred when a node plugging or unplugging is detected, and delaying bus reset only when such a data is being transferred until said data transfer is completed, so that it can delay only those bus reset for those data transfers that are preferable not to be interrupted and allow bus reset to be effectuated for other data transfers that would not cause any serious problems if their transfers are interrupted, thus effectively protecting the hot swapping function.

What is claimed is:

1. An interface device for use in an interface that performs reset and reconfiguration of a bus when a node is plugged or unplugged comprising:
    a node plugging/unplugging detector for detecting plugging and unplugging of a node;
    a data transfer detector for detecting whether a data transfer related to a specific node is occurring on said bus when node plugging or unplugging is detected by said node plugging/unplugging detector; and
    a bus reset issue controller for delaying issue of bus reset when a data transfer related to said specific node is detected by said data transfer detector until said data transfer is completed.

2. An interface device according to claim 1 wherein said data transfer detector comprises:
    a data receiver for receiving all data packets transferred on said bus;
    a data discriminator for discriminating whether a data transfer related to said specific node is occurring based on transmission/reception information or data type information contained in said data packets received by said data receiver.

3. An interface device according to claim 2 wherein said interface is a serial interface conforming to the IEEE 1394 standard, and
    said data discriminator discriminates whether a data transfer related to said specific node is occurring based on a judgment whether a channel number contained in said data packets is a channel number that is used by said specific node in receiving or transmitting data in an isochronous transmission.

4. A interface device according to claim 2 wherein said interface is a serial interface conforming to the IEEE 1394 standard, and
    said data discriminator discriminates whether a data transfer related to said specific node is occurring based on a judgment whether any transmitting side or receiving side node address contained in said data packets is a node address of said specific node in receiving or transmitting data in an asynchronous transmission.

5. An interface device according to claim 1 wherein said bus reset issue controller comprises:
    a node plugging/unplugging notification controller that does not notify a physical layer of said node plugging or unplugging when a data transfer related to said specific node is detected by said data transfer detector until said data transfer is completed; and
    a node information retainer that, when said node plugging or unplugging is an unplugging of the node and when a data transfer related to said specific node is detected by said data transfer detector until said data transfer is completed, retains information of the unplugged node and sends said information to the physical layer when requested.

6. An interface device according to claim 1 wherein an information of said specific node is specified and recorded in advance in said interface device.

7. An interface device according to claim 1 wherein an information of said specific node is specified by instruction from a node connected via said interface device.

8. A node of an interface that performs reset and reconfiguration of a bus when a node is plugged or unplugged, which is equipped with an interface device comprising:
    a node plugging/unplugging detector for detecting plugging and unplugging of a node;
    a data transfer detector for detecting whether a data transfer related to a specific node is occurring on said bus when node plugging or unplugging is detected by said node plugging/unplugging detector; and
    a bus reset issue controller for delaying issue of bus reset when a data transfer related to said specific node is detected by said data transfer detector until said data transfer is completed.

9. A node according to claim 8 wherein said data transfer detector comprises:
    a data receiver for receiving all data packets transferred on said bus;
    a data discriminator for discriminating whether a data transfer related to said specific node is occurring based on transmission/reception information or data type information contained in said data packets received by said data receiver.

10. An node according to claim 8 wherein an information of said specific node is specified and recorded in advance in said interface device.

11. An node according to claim 8 wherein an information of said specific node is specified by instruction from a node connected via said interface device.

12. An interface system that performs reset and reconfiguration of a bus when a node is plugged or unplugged and is composed of interconnected nodes each of which is equipped with an interface device comprising:
    a node plugging/unplugging detector for detecting plugging and unplugging of a node;
    a data transfer detector for detecting whether a data transfer related to a specific node is occurring on said bus when node plugging or unplugging is detected by said node plugging/unplugging detector; and a bus reset issue controller for delaying issue of bus reset when a data transfer related to said specific node is detected by said data transfer detector until said data transfer is completed.

13. A method for controlling bus reset in an interface that performs reset and reconfiguration of a bus when a node is plugged or unplugged comprising the step of:
   (a) detecting plugging and unplugging of a node;
   (b) detecting whether a data transfer related to a specific node is occurring on said bus when node plugging or unplugging is detected; and
   (c) delaying issue of bus reset when a data transfer related to said specific node is detected until said data transfer is completed.

14. A computer program product for controlling bus reset in an interface that performs reset and reconfiguration of a bus when a node is plugged or unplugged, said program causing a computer to execute the procedure of:
   (a) detecting plugging and unplugging of a node;
   (b) detecting whether a data transfer related to a specific node is occurring on said bus when node plugging and unplugging is detected; and
   (c) delaying issue of bus reset when a data transfer related to said specific node is detected until said data transfer is completed.

15. A computer program product according to claim 14 wherein said procedure (b) comprises:
   (1) receiving all data packets transferred on said bus;
   (2) discriminating whether a data transfer related to said specific node based on transmission/reception information or data type information contained in said data packets.

16. A computer program product according to claim 14 wherein said specific node is specified and recorded in advance in said interface device.

17. A computer program product according to claim 14 wherein said specific node is specified by instruction from a node connected via said interface device.

* * * * *